United States Patent [19]
Hori et al.

[11] Patent Number: 4,628,182
[45] Date of Patent: Dec. 9, 1986

[54] HOT-WIRE TIG WELDING APPARATUS

[75] Inventors: Katsuyoshi Hori; Eiji Watanabe; Toshiharu Myoga; Toshiaki Takuwa; Kazuki Kusano, all of Kure, Japan

[73] Assignee: Babcock-Hitachi Kabushiki Kaisha, Tokyo, Japan

[21] Appl. No.: 751,134

[22] Filed: Jul. 2, 1985

[30] Foreign Application Priority Data

Jul. 2, 1984 [JP] Japan ................... 59-135071

[51] Int. Cl.⁴ .............................................. B23K 9/09
[52] U.S. Cl. ........................ 219/130.51; 219/130.33; 219/137 PS
[58] Field of Search ............. 219/137 PS, 123, 130.51, 219/137.71, 130.32, 130.33

[56] References Cited

U.S. PATENT DOCUMENTS 3,627,974 12/1971 Normando et al. ............ 219/137 PS
4,366,362 12/1982 Ohta et al. .................... 219/123
4,396,823 8/1983 Nihei et al. ................... 219/137 PS

FOREIGN PATENT DOCUMENTS 58-138569 8/1983 Japan .................... 219/137 PS

OTHER PUBLICATIONS

Y. Kozono et al, "Studies on Twin Electrode Switching Arc Welding Method", 5/1983.

Primary Examiner—Clifford C. Shaw
Attorney, Agent, or Firm—Antonelli, Terry & Wands

[57] ABSTRACT

A hot wire TIG welding apparatus has a current detector for detecting the peak period and base period of the arc current. The welding apparatus further has a controller which controls, in response to the detection signal from the current detector, the operation of the wire heating power supply such that the wire heating power is supplied only during the base period of the arc current. According to this arrangement, a hot wire switching TIG welding apparatus can be produced using commercially available power supply systems for TIG arc welders, without requiring substantial change or modification of the control circuits in the TIG arc welders.

7 Claims, 6 Drawing Figures

HOT-WIRE TIG WELDING APPARATUS

BACKGROUND OF THE INVENTION

1. Field of the Invention

The present invention relates to a hot-wire TIG arc welding apparatus and, more particularly, to an inexpensive and widely usable hot-wire TIG arc welding apparatus.

2. Description of the Prior Art

As well known to those skilled in the art, in a hot-wire TIG arc welding method, a tungsten electrode and a base metal disposed in an inert shield gas such as argon gas are connected to an arc generating electric power source having a D.C. drooping characteristic such that the tungsten electrode and the base metal constitute a negative electrode and a positive electrode, respectively, so that an arc is formed in the argon shield gas to melt the base metal. In ordinary TIG arc welding, a wire of the welding material is simply fed to the melt of the base metal continuously. On the other hand, in a specific form of TIG arc welding generally known as "hot-wire TIG arc welding", a D.C. or an A.C. power is supplied to the wire which is being fed to the arc generating area from the wire feeding device such that Joule heat is generated in the wire thereby increasing the rate of melting of the wire.

In the TIG arc welding there has been caused a problem of magnetic blow phenomenon of arc which phenomenon is caused due to wire current. That is, when supplying wire heating current, the arc largely swings back and forth due to the electromagnetic interaction between the arc and wire heating current, with the result that a molten pool of a weld metal becomes unstable so that suitable welding can not be effected. Even in the case where A.C. is used as wire heating current, the arc can not be set to the center of the molten pool, so that suitable welding can not be effected. In order to effect suitable welding without substantial influence of the magnetic blow phenomenon, it is necessary to reduce the value of wire heating current to become one-half or less of arc current value, so that the rate of wire-melting is limited to the degree of 20 g/min. On the other hand, in order to minimize the magnetic blow phenomenon while increasing the rate of wire-melting, there is a hot-wire switching TIG welding as shown, for example, in U.S. Pat. No. 3,627,974 Specification dated Dec. 14, 1971. The inventors of the present invention have already invented a modified method of the hot-wire switching TIG welding in which the arc current is made to become pulsed current having both a peak value period and a base value period, power supply to the wire being not effected at the time of the peak current period, the power supply to the wire being effected only at the time of the base current period. According to the modified method, it becomes possible to obtain a wire melting rate of not less than 100 g/min without substantial influence of the magnetic blow phenomenon.

FIG. 1 shows an example of the power supply system for the hot wire switching TIG arc welding system which needs no exclusive power source. Namely, in the power supply system shown in FIG. 1, a switching unit employing a gate turn off (GTO) thyristor is combined with a commercially available TIG arc welding power supply system such that the hot wire switching welding may be effected. More specifically, a welding power source 3 having a D.C. drooping characteristic is connected between a torch 4 and a base metal 2 such as to form an arc 5 therebetween, and a first GTO thyristor 16 is connected to the wire 6 in parallel to the arc, so that the wire is heated periodically by consecutive turning on and off of the first GTO thyristor 16. Namely, when the first GTO thyristor 16 is turned on, the electric current supplied from the power source 3 as the arc current is short-circuited through the wire 6 thereby heating the wire 6. The welding cannot be restarted once the arc 5 is extinguished. Thus, in order to prevent extinction of the arc 5 during the heating of the wire 6, a base power source 18 is connected between the torch 4 and the base metal 5. The control for the optimum heating of the wire 6 is conducted by suitably short-circuiting the heating current through a second GTO thyristor 17 which is turned on and off in a controlled manner. The power supply system shown in FIG. 1 employs various other constituents such as a tungsten electrode 1, contact tip 7, wire feeding reel 11, gate control circuit 19, and a switching unit 20.

The power supply system shown in FIG. 1, however, is rather expensive due to the use of expensive current switching device of large capacity such as the GTO thyristors, although it can make use of a commercially available power source as the arc power source.

Under this circumstance, a hot wire switching TIG arc welding method has been proposed in which the wire heating power supply system is constituted by inexpensive semiconductor switches, e.g., triac, composed of usual thyristors, designed to effect the control of the phase of electric power supplied to the wire. FIG. 2 shows the principle of this type of wire heating power supply system. Namely, this power supply system incorporates an external controller 22 which produces a signal in the form of pulses which controls the TIG arc power source 21 and the wire heating power source 23 in such a manner that the wire is not supplied with the power during a period in which the current of the arc 5 takes the peak level (referred to as "peak period", hereinunder) but is supplied with the power during another period in which the current of the arc 5 takes the base level (referred to as "base period", hereinunder).

This type of power supply system, however, suffers from the following disadvantage. Namely, since this power supply system makes use of various types of commercially available TIG arc power supplies as the arc power supply 21, it is necessary to effect a suitable modification of the control circuit in the TIG arc welder used. The manner of modification of the control circuits varies one-by-one depending on the type of the welder and a study from a technical point of view is necessary for the determination of the manner of modification of the control circuit for the individual TIG arc welder.

SUMMARY OF THE INVENTION

Accordingly, an object of the invention is to provide a hot wire switching TIG arc welding apparatus which allows the use of a commercially available TIG arc power supply and which eliminates the necessity for the modification of the control circuit in the TIG arc welder.

Another object of the invention is to provide a hot wire switching TIG welding apparatus in which the undesirable magnetic blow phenomenon caused by the wire heating current is minimized.

To this end, according to the invention, there is provided a hot wire switching TIG welding apparatus having a current detector which detects the peak and base periods of arc current and produces signals, in accordance with which signals a wire heating power supply is controlled such that the power supply for heating the wire is conducted only during the base period of the arc current.

Other objects, features and advantages of the invention will become clear from the following description of the preferred embodiment.

DESCRIPTION OF THE PREFERRED EMBODIMENT

A preferred embodiment of the invention will be explained hereinunder with reference to the drawings.

Figure 1:
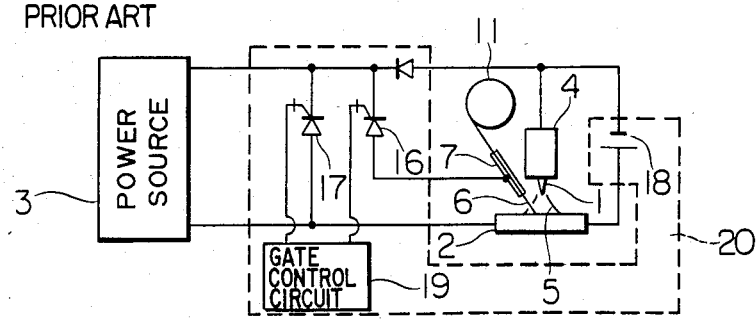
FIG. 1 shows a basic arrangement of a conventional power supply system for a hot wire TIG welding apparatus having switching units constituted by GTO.
Figure 2:
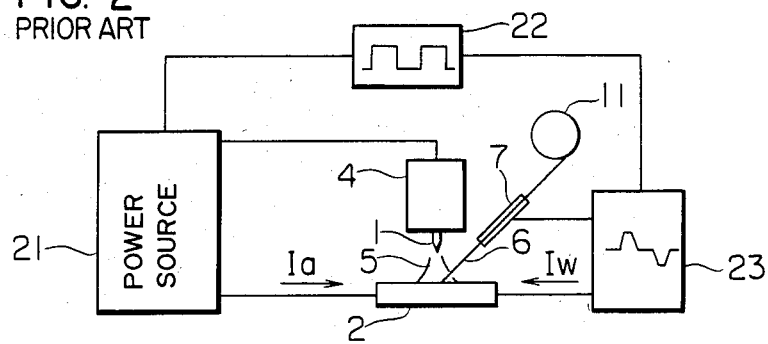
FIG. 2 is a conventional hot wire TIG welding apparatus making use of a triac.
Figure 3:
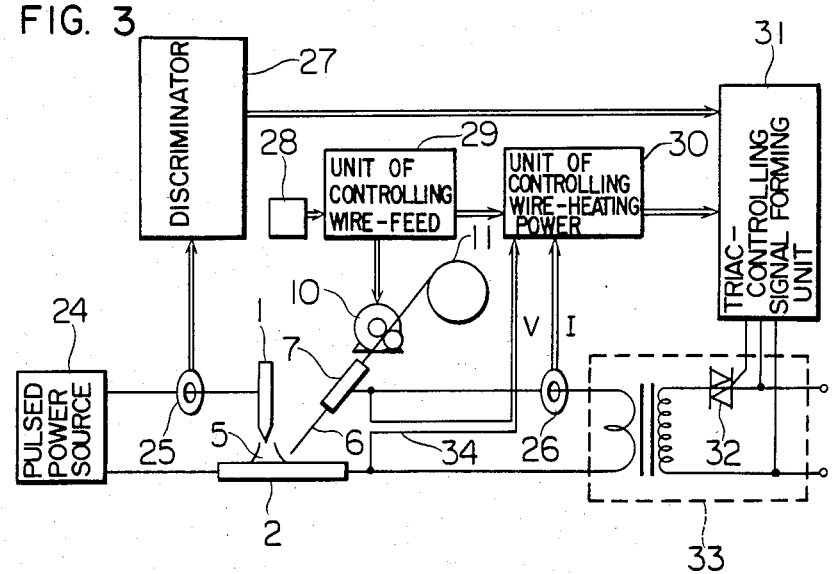
FIG. 3 shows the arrangement of a hot wire switching TIG welding apparatus embodied in accordance with the invention.

FIG. 3 is a circuit diagram of an embodiment of hot wire switching TIG welding apparatus embodying the invention, having a wire heating power supply which makes use of a bidirectional triode thyristor (referred to as "triac", hereinunder). In FIG. 3 and other Figures which show the embodiment of the invention, the same reference numerals are used to denote the same parts or members as those used in FIGS. 1 and 2 which show the prior art.

Referring to FIG. 3, a low pulsed arc 5 of 1 to 15 Hz is formed between a tungsten electrode 1 and the base metal 2, by means of a pulsed TIG power source 24. The low pulsed arc current is detected by an arc current detector 25 which delivers a signal to a discriminator 27 which discriminates the peak and the base of the pulse arc current from each other. The discriminator 27 delivers a signal to actuate a triac controlling signal generator 31. The triac controlling signal generator 31 produces a signal which controls the operation of the triac 32 such that the supply of heating power to the wire is made only during the base period of the arc current. The triac controlling signal generator 31 also has a function for optimizing the heating power supply to the wire in relation to the wire feeding rate. In operation, an operator selects and inputs a desired wire feeding rate to a wire feed rate controller 29 through a wire feed rate remote control box 28. Both a signal representing the wire current detected by a wire current detector 26 and a signal representing the wire terminal voltage detected by a wire terminal voltage detector 34 are inputted to a wire heating power controller 30. Upon receipt of these signals, the wire heating power controller 30 computes the product of the wire current and the wire terminal voltage, i.e., the instantaneous value of the wire heating power. The instantaneous value of the wire heating power is then inputted to a mean computing circuit having a time constant which is at least three times as large as the period of the pulse arc, so that the mean value of the wire heating power is obtained. This mean value of the heating power is compared with a voltage proportional to the wire feed rate inputted through the wire feed rate controller 29, and a feedback control of the phase of power supply to the triac 32 is effected to make a wire heating power optimized in relation to the wire feed rate. In FIG. 3, a reference numeral 10 designates a wire feeding device for operating the wire feed reel 11.

As will be understood from the foregoing description, the embodiment explained in connection with FIG. 3 permits the hot wire switching TIG welding to be carried out by optimumly operating the wire heating power supply 33 without substantially affecting the pulsed TIG power source 24.

Preferably, the control of the period of heating power supply to the wire conducted by the triac 32 is adjusted in accordance with the base period of the arc current such that the heating current is composed of pairs of positive and negative half waves, otherwise the wire heating current exhibits a D.C. component which would undesirably cause the biasing of magnetic flux distribution in iron core of the transformer used in the wire heating power supply 33.

Although in the described embodiment the base period of the arc current is detected by use of current-detecting signals, the base period can be detected through the detection of the arc voltage or other factors. The provision of the wire heating power controller 30 is not essential. Namely, the invention does not exclude such a modification that an operator controls the wire feeding rate upon visual check of the state of melting of the wire.

Figure 4:
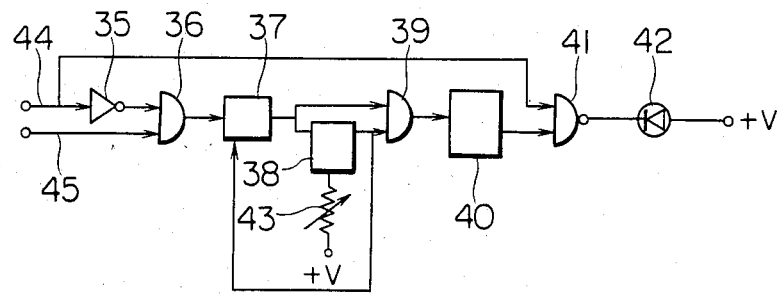
FIG. 4 is a circuit diagram of an example of a circuit for adjusting the period of power supply to the wire.
Figure 5:
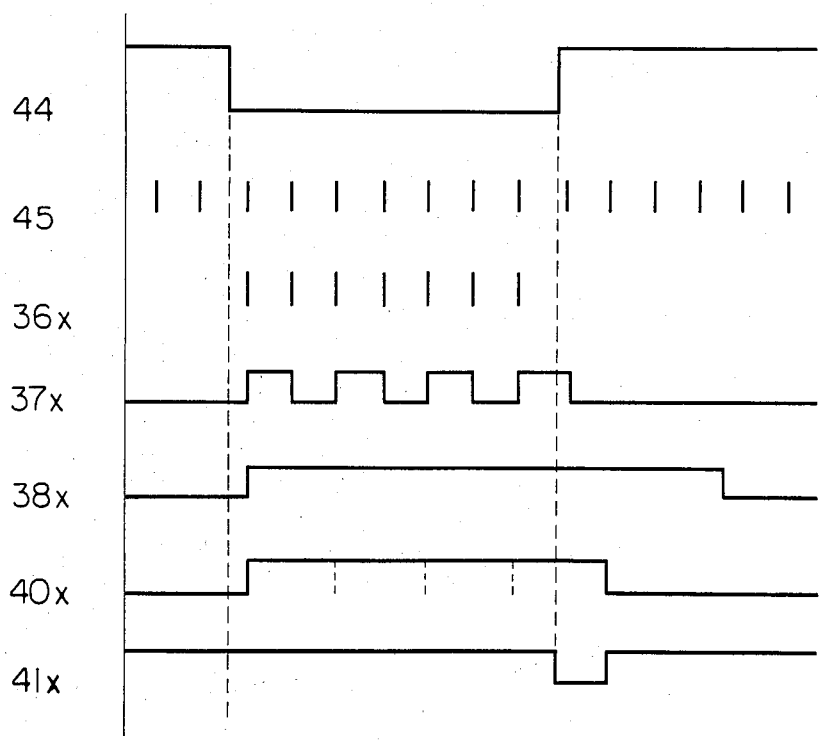
FIG. 5 is a signal time chart showing the timings of various signals obtained at various portions of the circuit shown in FIG. 4.

FIG. 4 shows an example of the circuit for adjusting the period of power supply to the wire. The operation of this circuit will be explained hereinunder with reference to a signal time chart shown in FIG. 5. In the base period of the arc current, the arc current detection signal 44 takes a low level. This level of the detection signal 44 is inverted by the NOT circuit 35 and is delivered to an AND circuit 36 while delivering to the AND circuit zero-cross pulses 45 of the A.C. power wave. Then, the AND circuit 36 outputs only the zero-cross pulses 36x received within the base period of the arc current. This output signal is delivered to a flip-flop circuit 37 which in turn delivers an output 37x to a variable-width one-shot multivibrator 38. The output signal 38x from the multivibrator 38 and the output signal 37x from the flip-flop circuit 37 are delivered to an AND circuit 39. The output of the AND circuit 39 is delivered to a monostable retriggable multivibrator 40 which is triggered when the input pulse rises and which produces pulses of a pulse width equal to one cycle of the A.C. power supply. The output pulse 40x from the multivibrator 40 is inputted to a NAND circuit 41 together with the detection signal 44 representing the base period of the arc current. A light-emitting diode 42 burns when the output signal 41x from the NAND circuit 41 takes the low level, indicating that the period of output 40x of the monostable retriggable multivibrator exceeds the base period of the arc current represented by the detection signal 44. By the described signal processing operation, it is possible to judge whether the current in the triac is composed of pairs of positive and negative half waves. In order to avoid the last trigger of the output signal 40x, one last rising pulse signal inputted to the monostable retriggable multivibrator 40 is omitted by reducing the pulse width of the output 38x from the variable-width one-shot multivibrator 38 by means of a pulse width modulation volume 43, that is, an operator operates the volume 43 such that the light-emitting diode 42 does not burn. The output 40x derived from the monostable retriggable multivibrator 40 after the above-explained pulse width adjustment is used as the period of power supply to the wire.

Practically, this adjustment of the period of power supply to the wire is conducted by means of a test arc at the time of initial setting up of welding condition. More specifically, the operator first maximizes the pulse-width modulation volume 43 so as to provide the maximum pulse width of the output 40x from the one-shot multivibrator 40 so that the light-emitting diode 42 burns. Then, the operator operates the pulse-width modulation volume 43 such that the pulse width of the output 40x is gradually decreased. At the time when the light-emitting diode 42 is turned off, it is deemed that the setting up of the welding condition is completed.

The circuit shown in FIG. 4 is only illustrative and various other circuit may be used for ensuring that the heating current supplied to the wire is composed of pairs of positive and negative half waves.

Figure 6:
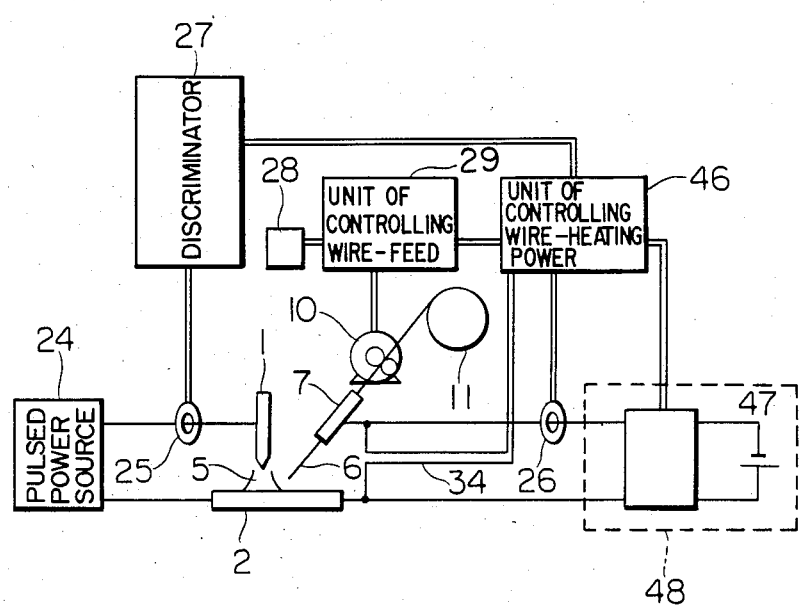
FIG. 6 shows the construction of an embodiment which makes use of a D.C. wire heating power supply.

FIG. 6 shows the principle of another embodiment of the invention. This embodiment makes use of a D.C. source as the wire heating power supply 48. The D.C. wire heating power supply 48 incorporates a switching device 47 such as a transistor of large capacity, for the purpose of controlling the wire heating power. A reference numeral 46 designates a wire heating power controller. The power supply system may be either of the type having the switching transistor in the secondary side of the transformer or of an inverter type in which the transistor is provided in the primary side of the transformer.

The embodiment shown in FIG. 6 differs from the basis embodiment shown in FIG. 3 in that the wire heating power controller 46 has also the function of the triac controlling signal generator used in the basic embodiment.

In addition, the embodiment shown in FIG. 4 provides a higher response characteristics than the basic embodiment by virture of the use of the switching transistor. Namely, since the transistor can produce square-wave unlike the thyristor used in the basis embodiment so that the peak level of the wire heating current can be lowered to minimize the undesirable magnetic blowing of arc during the base period of the arc current.

As will be understood from the foregoing description, the present invention provides a hot wire switching TIG welding apparatus by using commercially available power supply systems for TIG arc welders, without requiring any substantial change or modification of the control circuits in the TIG arc welders.

What is claimed is:

1. A hot wire TIG welding apparatus having, in combination, pulsed arc TIG welding power supply means and wire heating power supply means, said TIG welding apparatus comprising:
   (a) means for detecting the pulsed arc current;
   (b) a discriminating means which discriminates, upon receipt of a signal from said detecting means, the peak current and the base current of said pulsed arc current; and
   (c) a controller which controls, in response to a signal from said discriminating means, the operation of said wire heating power supply in such a manner that the supply of heating power to the wire is conducted only during a base period in which said arc current is formed only by said base current.

2. A hot wire TIG welding apparatus according to claim 1, wherein said wire heating power supply means is constituted by a D.C. power supply which incorporates a large current switching device having a large capacity adapted to control the supply of the heating power to said wire.

3. A hot wire TIG welding apparatus according to claim 2, said switching device includes a thyristor.

4. A hot wire TIG welding apparatus according to claim 1, wherein said wire heating power supply means is constituted by an A.C. power supply which incorporates a semiconductor A.C. switch adapted to control the supply of the heating power to said wire.

5. A hot wire TIG welding apparatus according to claim 4, wherein the current switched by said A.C. switch and supplied to said wire is composed of pairs of positive and negative half waves.

6. A hot wire TIG welding apparatus according to claim 4, wherein said A.C. switch includes a transistor.

7. A hot wire TIG welding apparatus according to claim 1, further comprising means for feeding said wire, and means for detecting the heating power in said wire and for controlling the heating power so that the heating power is optimized in relation to a feed rate of said wire.

* * * * *